(12) United States Patent
Trepte

(10) Patent No.: US 8,139,059 B2
(45) Date of Patent: Mar. 20, 2012

(54) OBJECT ILLUMINATION IN A VIRTUAL ENVIRONMENT

(75) Inventor: Forrest Trepte, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/278,264

(22) Filed: Mar. 31, 2006

(65) Prior Publication Data

US 2007/0236485 A1 Oct. 11, 2007

(51) Int. Cl.
*G06T 15/50* (2011.01)
(52) U.S. Cl. .......... 345/426; 345/20; 345/180; 345/207; 345/418; 382/103; 382/128
(58) Field of Classification Search .................. 345/418, 345/419, 426, 582, 583, 156, 157, 173, 175, 345/177, 180, 184, 169, 207, 440; 382/103, 382/128
See application file for complete search history.

(56) References Cited

U.S. PATENT DOCUMENTS

| | | |
|---|---|---|
| 4,817,176 A | 3/1989 | Marshall et al. .............. 382/280 |
| 5,230,063 A | 7/1993 | Hoeber et al. |
| 5,252,951 A | 10/1993 | Tannenbaum et al. ........ 345/156 |
| 5,345,549 A | 9/1994 | Appel et al. ................... 715/741 |
| 5,423,554 A | 6/1995 | Davis |
| 5,434,964 A | 7/1995 | Moss et al. |
| 5,463,725 A | 10/1995 | Henckel et al. ............... 715/776 |
| 5,665,951 A | 9/1997 | Newman et al. |
| 5,714,698 A | 2/1998 | Tokioka et al. |
| 5,804,803 A | 9/1998 | Cragun et al. |
| 5,818,450 A | 10/1998 | Katsuta |
| 5,883,626 A | 3/1999 | Glaser et al. |
| 5,910,653 A * | 6/1999 | Campo .................... 250/214 AL |
| 5,943,164 A * | 8/1999 | Rao ............................... 359/462 |
| 6,159,100 A | 12/2000 | Smith |
| 6,181,343 B1 | 1/2001 | Lyons |

(Continued)

FOREIGN PATENT DOCUMENTS

WO  WO 0050979  8/2000

(Continued)

OTHER PUBLICATIONS

Shen et al., "DiamondSpin: An Extensible Toolkit for Around-the-Table Interaction", http://hci.stanford.edu/publications/2004/diamondspin/diamondspin.pdf, Apr. 2004, 8 pp.

(Continued)

*Primary Examiner* — Andrew Wang
*Assistant Examiner* — Abderrahim Merouan
(74) *Attorney, Agent, or Firm* — Merchant & Gould

(57) ABSTRACT

Methods and systems for displaying an image as a virtual representation of an object based upon detected external light are described. An illustrative computer-implemented method includes steps of detecting the ambient light of an environment, such as a room, at a display surface. Data representative of the detected ambient light is processed to determine a direction of the detected light with respect to the display surface. An image is displayed on the display surface as a virtual representation of an object based upon the detected ambient light. Shadowing affects may be displayed to create the appearance that the virtual representation of the object casts a shadow on the display surface. Physical objects placed against or near to the surface of the display surface may also have images displayed on the display surface corresponding to shadows created by the ambient light.

20 Claims, 16 Drawing Sheets

U.S. PATENT DOCUMENTS

| | | | |
|---|---|---|---|
| 6,240,207 B1 | 5/2001 | Shinozuka et al. | 382/187 |
| 6,247,128 B1 | 6/2001 | Fisher et al. | |
| 6,333,735 B1 | 12/2001 | Anvekar | |
| 6,414,672 B2* | 7/2002 | Rekimoto et al. | 345/173 |
| 6,445,364 B2 | 9/2002 | Zwern | |
| 6,448,964 B1 | 9/2002 | Isaacs et al. | |
| 6,452,593 B1* | 9/2002 | Challener | 345/419 |
| 6,512,507 B1 | 1/2003 | Furihata | |
| 6,545,663 B1* | 4/2003 | Arbter et al. | 345/158 |
| 6,568,596 B1 | 5/2003 | Shaw | |
| 6,577,330 B1 | 6/2003 | Tsuda et al. | |
| 6,593,945 B1 | 7/2003 | Nason et al. | |
| 6,624,833 B1* | 9/2003 | Kumar et al. | 715/863 |
| 6,630,943 B1 | 10/2003 | Nason et al. | |
| 6,662,365 B1 | 12/2003 | Sullivan et al. | |
| 6,667,741 B1* | 12/2003 | Kataoka et al. | 345/426 |
| 6,672,961 B1 | 1/2004 | Uzun | |
| 6,686,931 B1 | 2/2004 | Bodnar | 715/741 |
| 6,720,860 B1 | 4/2004 | Narayanaswami | 340/5.54 |
| 6,735,625 B1 | 5/2004 | Ponna | |
| 6,745,234 B1 | 6/2004 | Philyaw et al. | |
| 6,767,287 B1 | 7/2004 | McQuaid et al. | |
| 6,768,419 B2 | 7/2004 | Karel et al. | |
| 6,791,530 B2 | 9/2004 | Vernier et al. | |
| 6,792,452 B1 | 9/2004 | Philyaw | |
| 6,822,635 B2 | 11/2004 | Shahoian et al. | |
| 6,842,175 B1* | 1/2005 | Schmalstieg et al. | 345/427 |
| 6,847,856 B1 | 1/2005 | Bohannon | |
| 6,910,076 B2 | 6/2005 | Lortz | |
| 6,950,534 B2 | 9/2005 | Cohen et al. | |
| 6,965,842 B2 | 11/2005 | Rekimoto | |
| 6,990,660 B2 | 1/2006 | Moshir et al. | |
| 7,036,090 B1 | 4/2006 | Nguyen | |
| 7,085,590 B2 | 8/2006 | Kennedy et al. | |
| 7,098,891 B1* | 8/2006 | Pryor | 345/158 |
| 7,104,891 B2* | 9/2006 | Osako et al. | 463/32 |
| 7,148,876 B2* | 12/2006 | Kawasome | 345/156 |
| 7,259,747 B2* | 8/2007 | Bell | 345/156 |
| 7,327,376 B2 | 2/2008 | Shen et al. | |
| 7,397,464 B1 | 7/2008 | Robbins et al. | 345/173 |
| 7,469,381 B2 | 12/2008 | Ording | |
| 7,483,015 B2* | 1/2009 | Sato | 345/156 |
| 7,612,786 B2 | 11/2009 | Vale et al. | 345/619 |
| 2001/0012001 A1* | 8/2001 | Rekimoto et al. | 345/173 |
| 2001/0054082 A1 | 12/2001 | Rudolph et al. | |
| 2002/0109737 A1 | 8/2002 | Jaeger | |
| 2002/0151337 A1 | 10/2002 | Yamashita et al. | |
| 2002/0154214 A1 | 10/2002 | Scallie et al. | |
| 2002/0180811 A1 | 12/2002 | Chu | 345/856 |
| 2003/0025676 A1 | 2/2003 | Cappendijk | |
| 2003/0063132 A1 | 4/2003 | Sauer et al. | |
| 2003/0119576 A1 | 6/2003 | McClintic et al. | |
| 2003/0234773 A1 | 12/2003 | Sano et al. | |
| 2004/0005920 A1* | 1/2004 | Soltys et al. | 463/25 |
| 2004/0032409 A1* | 2/2004 | Girard | 345/426 |
| 2004/0046784 A1 | 3/2004 | Shen | |
| 2004/0051733 A1 | 3/2004 | Katzie | |
| 2004/0090432 A1 | 5/2004 | Takahashi et al. | |
| 2004/0119746 A1 | 6/2004 | Mizrah | 345/763 |
| 2004/0127272 A1 | 7/2004 | Park et al. | |
| 2004/0141008 A1 | 7/2004 | Jarczyk et al. | |
| 2004/0212617 A1 | 10/2004 | Fitzmaurice | |
| 2005/0054392 A1 | 3/2005 | Too | |
| 2005/0069188 A1 | 3/2005 | Rubbert et al. | |
| 2005/0110781 A1 | 5/2005 | Geaghan et al. | |
| 2005/0122308 A1* | 6/2005 | Bell et al. | 345/156 |
| 2005/0134578 A1 | 6/2005 | Chambers et al. | |
| 2005/0146508 A1 | 7/2005 | Kirkland et al. | |
| 2005/0153128 A1 | 7/2005 | Selinfreund et al. | |
| 2005/0162402 A1 | 7/2005 | Watanachote | |
| 2005/0166264 A1 | 7/2005 | Yamada et al. | |
| 2005/0177054 A1 | 8/2005 | Yi et al. | |
| 2005/0183035 A1 | 8/2005 | Ringel | |
| 2005/0193120 A1 | 9/2005 | Taylor | |
| 2005/0200291 A1* | 9/2005 | Naugler et al. | 315/149 |
| 2005/0248729 A1 | 11/2005 | Drucker et al. | |
| 2005/0251800 A1 | 11/2005 | Kurlander et al. | |
| 2005/0253872 A1 | 11/2005 | Goss et al. | |
| 2005/0275622 A1 | 12/2005 | Patel et al. | 345/156 |
| 2005/0277071 A1* | 12/2005 | Yee | 430/396 |
| 2005/0280631 A1 | 12/2005 | Wong et al. | |
| 2006/0015501 A1 | 1/2006 | Sanamrad et al. | 707/9 |
| 2006/0017709 A1 | 1/2006 | Okano | |
| 2006/0026535 A1 | 2/2006 | Hotelling et al. | |
| 2006/0075250 A1 | 4/2006 | Liao | |
| 2006/0077211 A1 | 4/2006 | Zhou | |
| 2006/0090078 A1 | 4/2006 | Blythe et al. | 716/185 |
| 2006/0119541 A1 | 6/2006 | Blythe et al. | 345/31 |
| 2006/0156249 A1 | 7/2006 | Blythe et al. | |
| 2006/0161871 A1 | 7/2006 | Hotelling et al. | |
| 2006/0244719 A1* | 11/2006 | Brigham et al. | 345/156 |
| 2006/0244734 A1 | 11/2006 | Hill et al. | |
| 2007/0063981 A1* | 3/2007 | Galyean et al. | 345/173 |
| 2007/0188518 A1 | 8/2007 | Vale et al. | |
| 2007/0220444 A1 | 9/2007 | Sunday et al. | |
| 2007/0284429 A1 | 12/2007 | Beeman | |
| 2007/0300182 A1 | 12/2007 | Bilow | |
| 2007/0300307 A1 | 12/2007 | Duncan | |
| 2008/0040692 A1 | 2/2008 | Sunday et al. | |
| 2008/0192005 A1 | 8/2008 | Elgoyhen et al. | 345/158 |
| 2008/0211813 A1* | 9/2008 | Jamwal et al. | 345/426 |

FOREIGN PATENT DOCUMENTS

| | | |
|---|---|---|
| WO | WO 0236225 | 5/2002 |
| WO | WO 2005040944 | 5/2005 |
| WO | WO 20050122557 | 12/2005 |
| WO | WO 2006003586 | 1/2006 |

OTHER PUBLICATIONS

Wilson, "PlayAnywhere: A Compact Interactive Tabletop Projection-Vision System", http://research.microsoft.com/~awilson/papers/Wilson%20PlayAnywhere%20UIST%202005.pdf, Oct. 2005, 10 pp.

Krishna et al., "23.3: Tactile Sensor Based on Piezoelectric Resonance", 2002 IEEE, pp. 1643-1647.

http://www.softsland.com/Natural_Login_Pro.html, Apr. 13, 2006, 3 pp.

Logitech, "SecureConnect: A Major Leap in the Cordless Desktop Experience", http://www.logitech.com/pub/pdf/bluetooth/secure_connect_whitepaper.pdf, received Apr. 7, 2006, 5 pp.

Elzabadani et al., "Self-Sensing Spaces: Smart Plugs for Smart Environments", http://www.icta.ufl.edu/projects/publications/2005-ICOST-Selfsensingspaces.pdf, received Apr. 7, 2006, 8 pp.

Symantec, "Symantec Discovery: Track hardware/software assets and monitor license compliance throughout a multiplatform IT infrastructure", http://eval.veritas.com/mktginfo/enterprise/fact_sheets/ent-factsheet_discovery_12-2005.en-us.pdf, Dec. 2005, 5 pp.

Stoakley et al., "Virtual Reality on a WIM: Interactive Worlds in Miniature", Conference on Human factors in Computer Systems, Proceedings of the SIGCHI Conference on Human Factors in Computing Systems, ACM Press/Addison-Wesley Publishing Co., http://delivery.acm.org/10.1145/230000/223938/p265-stoakley.html?key1=223938&key2=5808034411&coll=GUIDE&dl=GUIDE&CFID=73042672&CFTOKEN=344092 262, 1995, 14 pp.

Nikitin et al., "Real-Time Simulation of Elastic Objects in Virtual Environments Using Finite Element Method and Precomputed Green's Functions", Eighth Eurographics Workshop on Virtual Environments, 2002, 6 pp.

TouchTable™, Northrop Grumman, www.northropgrumman.com, 2005, 2 pp.

TouchTable™, Northrop Grumman, http://www.ms.northropgrumman.com/touchtable.index.html, 2006, 2 pp.

U.S. Official Action mailed May 30, 2008 in U.S. Appl. No. 11/425,843.

U.S. Official Action mailed Jul. 9, 2008 in U.S. Appl. No. 11/378,267.

U.S. Official Action mailed Jul. 10, 2008 in U.S. Appl. No. 11/423,883.

U.S. Official Action mailed Oct. 7, 2008 in U.S. Appl. No. 11/350,853.

U.S. Official Action mailed Jan. 12, 2009 cited in U.S. Appl. No. 11/378,267.
U.S. Official Action mailed Jan. 23, 2009 cited in U.S. Appl. No. 11/423,883.
U.S. Official Action mailed Oct. 5, 2009, in U.S. Appl. No. 11/378,267.
U.S. Official Action mailed Jul. 9, 2009 in U.S. Appl. No. 11/426,101.
U.S. Official Action mailed Dec. 15, 2009 in U.S. Appl. No. 11/426,101.
Microsoft® Paint Version 5.1 Screenshots, Microsoft Corporation, 2007, 2 pp.
U.S. Official Action mailed Feb. 24, 2010 in U.S. Appl. No. 11/426,101.
U.S. Official Action mailed Mar. 5, 2010 in U.S. Appl. No. 11/378,267.
U.S. Official Action mailed Jul. 2, 2010 in U.S. Appl. No. 11/426,101.
U.S. Official Action mailed Oct. 6, 2010 in U.S. Appl. No. 11/427,684.
U.S. Official Action mailed Nov. 22, 2010 in U.S. Appl. No. 11/426,101.
U.S. Official Action mailed Apr. 20, 2011 in U.S. Appl. No. 11/427,684.

* cited by examiner

OBJECT ILLUMINATION IN A VIRTUAL ENVIRONMENT

BACKGROUND

Virtual reality allows a user to experience a virtual world that is simulated using one or more computers. In constructing a computing device that renders virtual objects, allows a user to interact with the virtual objects through touch, and also interacts with real objects placed on the computing device, a virtual world presented by the computing device and the real world itself become tightly coupled. Instead of presenting a portal to a different world, it may be desired to have the device become a part of the environment of the user. Shadowing of virtual objects rendered by the computing device may be configured to place the shadow as defined by a predefined imaginary light source. However, a virtual scene as rendered on a computing device may appear out-of-place with respect to real world lights sources illuminating the computing device itself.

For example, an environment may be configured to have a lamp or other light source to a left side of the described computing device as shown in FIG. 1A. A cup or other real world object that is set beside the computing device as shown casts a shadow to the right. However, as shown in FIG. 1B, a virtual cup rendered by the computing device is configured to cast a shadow to its left. If virtual objects rendered by the computing device are illuminated differently that other objects in the room, this creates a disconnect.

The video gaming industry has made great strides to bring realistic feels and situations to a video game for a user to experience. Manufacturers have developed steering wheel and pedal based controllers for car driving games and pistol shaped controllers for first person shooter type games. These devices help to increase the realism of the experience. Additional controller features allow the user of the controller to feel a vibration that corresponds to an event, such as hitting a wall or getting hit by a bullet in a game. However, greater development is needed to place the gaming environment to real world lighting conditions.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In accordance with one or more aspects of the present invention, virtual objects as part of some display device are illuminated by detection of real world lighting conditions and/or sources. An image representing incoming ambient light at the surface of a device is captured. The device may be a display screen of a computing device, such as a computer monitor or a virtual object rendering device. The captured image is then treated as a hemispherical light source to illuminate a three-dimensional scene rendered to the display associated with the device. The resulting virtual objects are lit and/or shadowed in a fashion that is consistent with the real light sources around the display, tying together the world inside and outside of the display.

Aspects of the present invention are directed to a computing device including at least one processor, memory, a light detection mechanism, and a display surface. The light detection mechanism is configured to detect ambient light of an environment, such as a room, at or near to the display surface. The at least one processor processes data representative of the detected ambient light to determine a direction of the ambient light with respect to the display surface and displays an image of an object on the display surface based upon the processed data.

Another illustrative aspect is directed to display of shadowing effects corresponding to virtual shadows displayed on a display surface based upon detected ambient light within an environment, such as a room. Physical or virtual objects may have a corresponding shadow displayed on a display surface. Aspects of the present invention may be utilized within a computing device where a display surface is a horizontal surface and a camera positioned behind the display surface captures images of objects on or near to the display surface and detects ambient light external to the computing device.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Figure 1A:
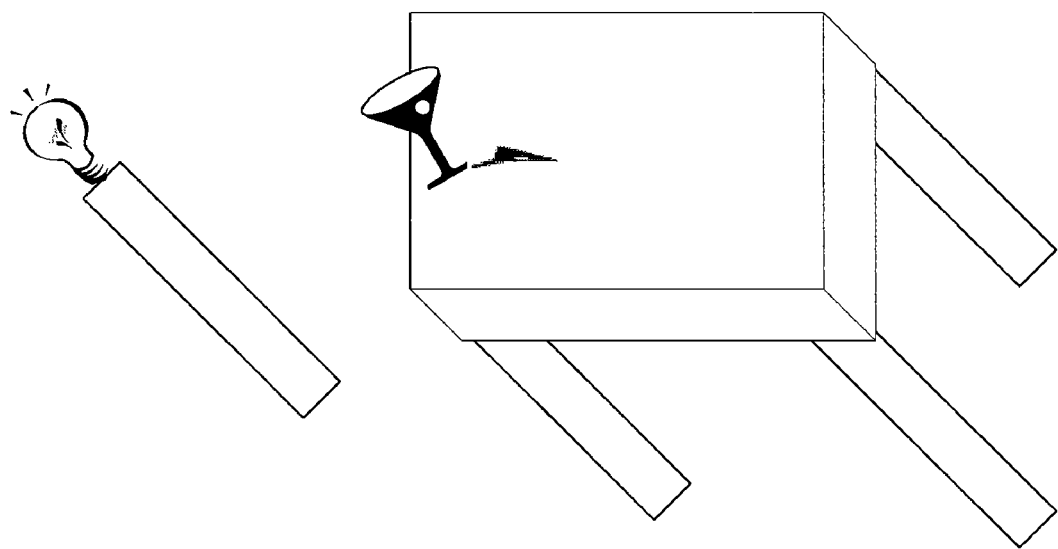
FIG. 1 illustrates a schematic diagram of a general-purpose digital computing environment in which certain aspects of the present invention may be implemented.
Figure 1B:
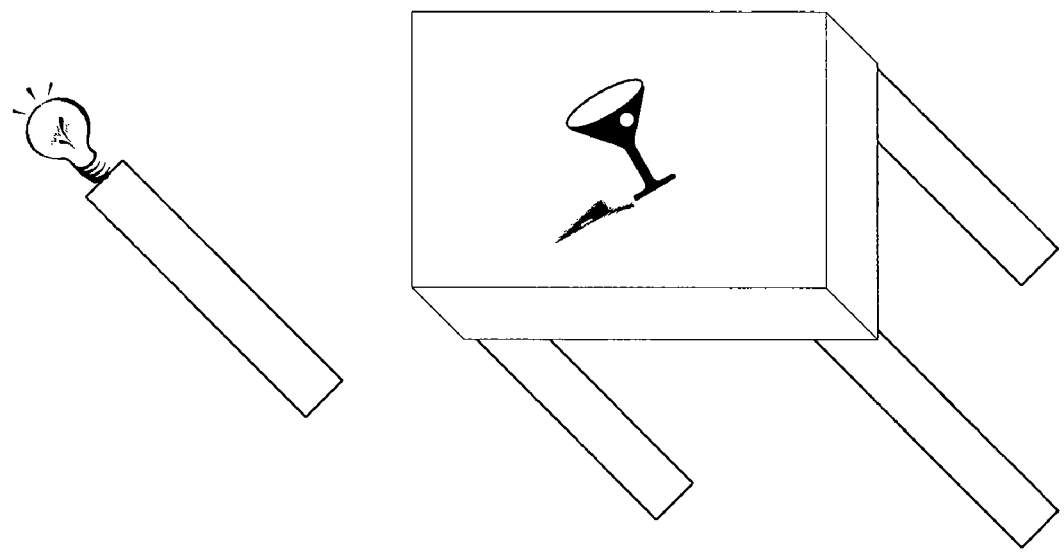
Figure 2:
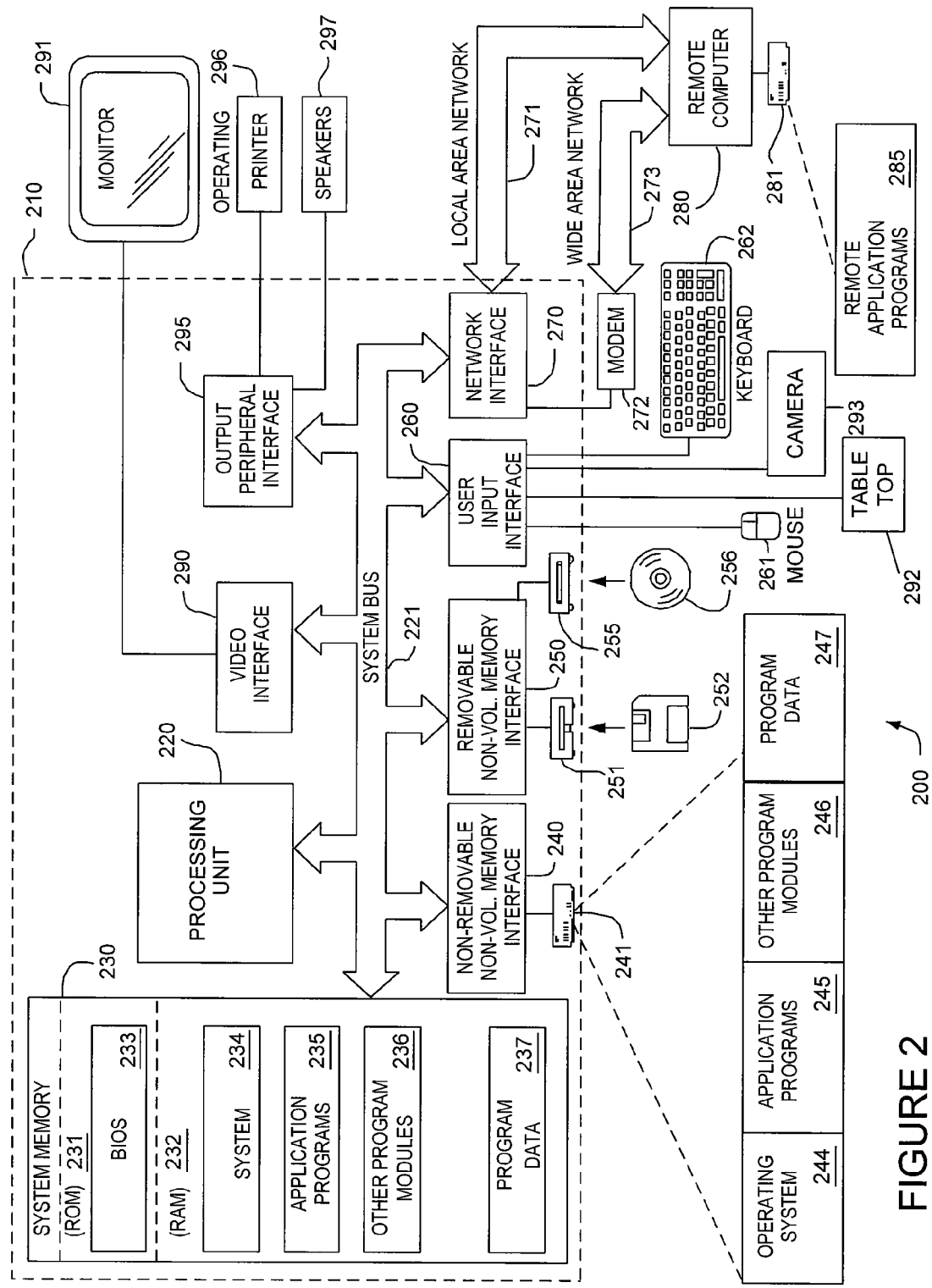
FIG. 2 illustrates an interactive table environment and interface in accordance with one or more aspects of the present invention.

FIG. 2 illustrates an example of a suitable computing system environment 200 on which the features herein may be implemented. The computing system environment 200 is only one example of a suitable computing environment and is not intended to suggest any limitation as to the scope of use or functionality of the features described herein. Neither should the computing environment 200 be interpreted as having any dependency or requirement relating to any one or combination of components illustrated in the exemplary operating environment 200.

The features herein are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 2, the illustrative system 200 for implementing features described herein includes a general purpose-computing device in the form of a computer 210 including a processing unit 220, a system memory 230, and a system bus 221 that couples various system components including the system memory to the processing unit 220.

Computer 210 may include a variety of computer readable media. By way of example, and not limitation, computer readable media may comprise computer storage media and communication media. The system memory 230 may include computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, may be stored in ROM 231. RAM 232 may contain data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 may be connected to the system bus 221 through a non-removable memory interface such as interface 240, and magnetic disk drive 251 and optical disk drive 255 may be connected to the system bus 221 by a removable memory interface, such as interface 250.

The drives and their associated computer storage media discussed above and illustrated in FIG. 2 may provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device may also be connected to the system bus 221 via an interface, such as a video interface 290. The video interface 290 may be bidirectional, and may receive video input from sensors associated with the monitor 291. For example, the monitor 291 may be touch and/or proximity sensitive, such that contacts to a monitor surface may be used as input data. The input sensors for affecting this could be a capacitive touch sensitive device, an array of resistive contact sensors, an optical sensor or camera, or any other desired sensor to make the monitor 291 touch and/or proximity sensitive. In an alternative arrangement, or in addition, a touch and/or proximity sensitive input system may be separate from monitor 291, and may include a planar surface such as a table top 292 and any applicable sensing systems to make the planar surface touch sensitive, such as camera 293. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks.

When used in a LAN networking environment, the computer 210 may be connected to the LAN 271 through a network interface or adapter 270. When used in a WAN networking environment, the computer 210 may include a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 220.

It will be appreciated that the network connections shown are illustrative and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 3:
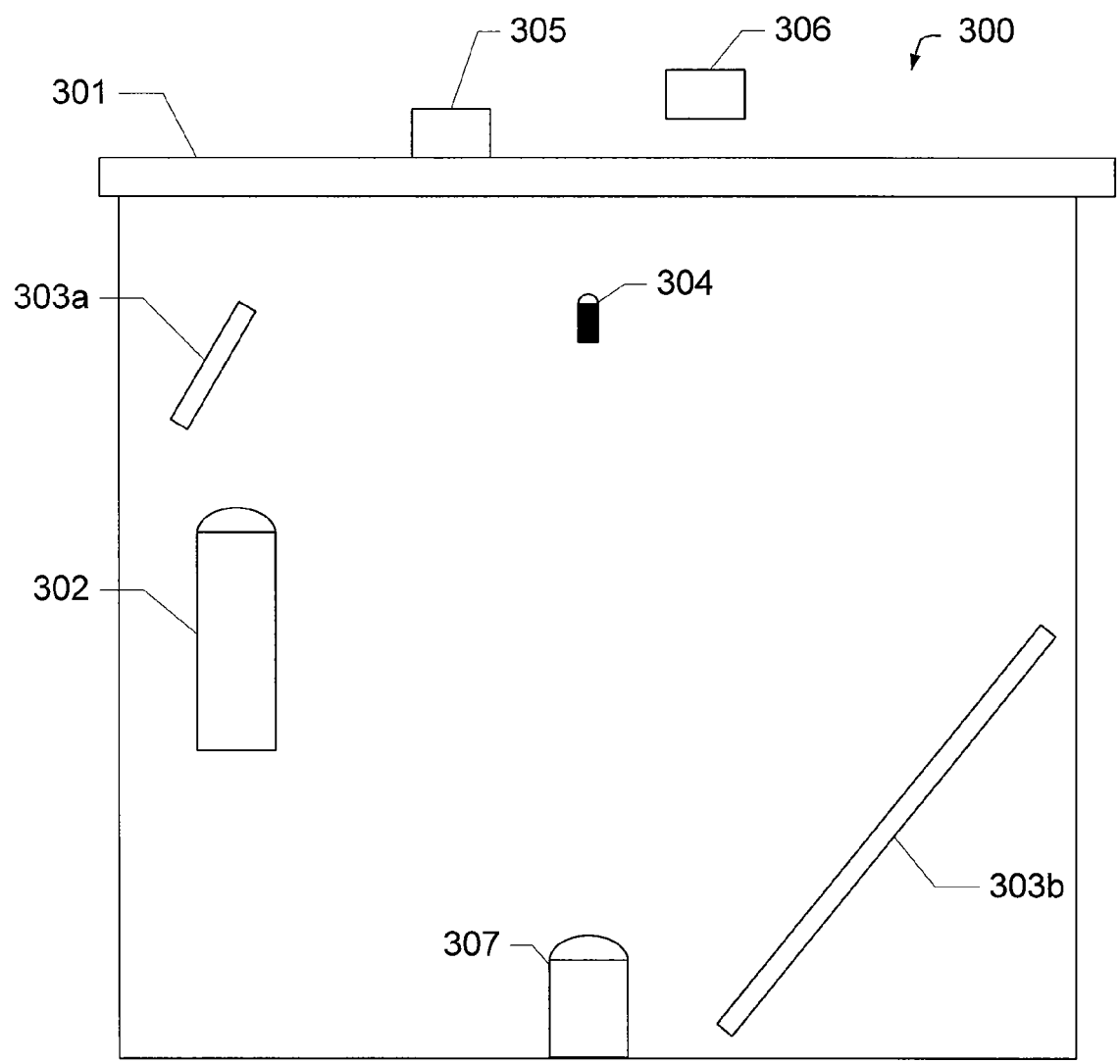
FIG. 3 illustrates an example of an interactive display in accordance with one or more aspects of the present invention.

The computing device shown in FIG. 2 may be incorporated into a system having table display device 300, as shown in FIG. 3. The display device 300 may include a display surface 301, which may be a planar surface such as a table top. As described hereinafter, the display surface 301 may also help to serve as a user interface.

The display device 300 may display a computer-generated image on its display surface 301, which allows the device 300 to be used as a display monitor for computing processes, displaying television or other visual images, video games, and the like. The display may be projection-based, and may use a digital light processing (DLP) technique, or it may be based on other display technologies, such as liquid crystal display (LCD) technology. A projector 302 may be used to project light onto the underside of the display surface 301. It may do so directly, or may do so using one or more mirrors. As shown in FIG. 3, the projector 302 projects light for a desired image onto a first reflective surface 303a, which may in turn reflect light onto a second reflective surface 303b, which may ultimately reflect that light onto the underside of the display surface 301, causing the surface 301 to emit light corresponding to the desired display.

In addition to being used as an output display for displaying images, the device 300 may also be used as an input-receiving device. As illustrated in FIG. 3, the device 300 may include one or more light emitting devices 304, such as IR light emitting diodes (LEDs), mounted in the interior of the device. The light from devices 304 may be projected upwards through the display surface 301, and may reflect off of various objects that are above the display surface 301. For example, one or more objects 305 may be placed in physical contact with the display surface 301. One or more other objects 306 may be placed near the display surface 301, but not in physical contact (e.g., closely hovering). The light emitted from the emitting device(s) 304 may reflect off of these objects, and may be detected by a camera 307, which may be an IR camera if IR light is used. The signals from the camera 307 may then be forwarded to a computing device (e.g., the device shown in FIG. 2) for processing, which, based on various configurations for various applications, may identify the object and its orientation (e.g. touching or hovering, tilted, partially touching, etc.) based on its shape and the amount/type of light reflected.

To assist in identifying the objects 305, 306, the objects may include a reflective pattern, such as a bar code, on their lower surface. To assist in differentiating objects in contact 305 from hovering objects 306, the display surface 301 may include a translucent layer that diffuses emitted light. Based on the amount of light reflected back to the camera 307 through this layer, the associated processing system may determine whether an object is touching the surface 301, and if the object is not touching, a distance between the object and the surface 301. Accordingly, various physical objects (e.g., fingers, elbows, hands, stylus pens, blocks, etc.) may be used as physical control members, providing input to the device 300 (or to an associated computing device).

The device 300 shown in FIG. 3 is illustrated as using light projection- and sensing techniques for the display of data and the reception of input, but other techniques may be used as well. For example, stylus-sensitive displays are currently available for use with Tablet-based laptop computers, and such displays may be used as device 300. Additionally, stylus- and touch-sensitive displays are available with many personal data assistants (PDAs), and those types of displays may also be used as device 300.

The device 300 is also shown in a substantially horizontal orientation, with the display surface 301 acting as a tabletop. Other orientations may also be used. For example, the device 300 may be oriented to project a display onto any desired surface, such as a vertical wall. Reflective IR light may also be received from any such oriented surface.

Figure 5:
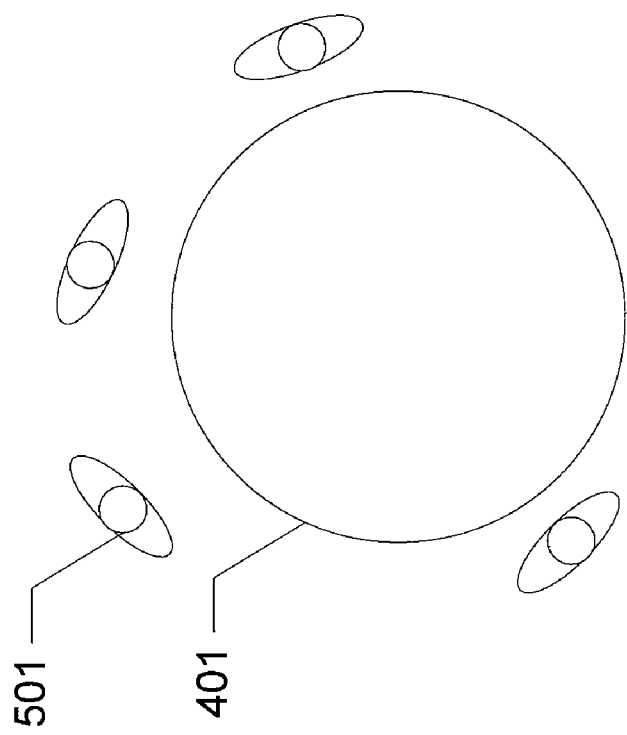
FIG. 5 illustrates an example display surface having a physical object and corresponding virtual version image in accordance with one or more aspects of the present invention.
Figure 4:
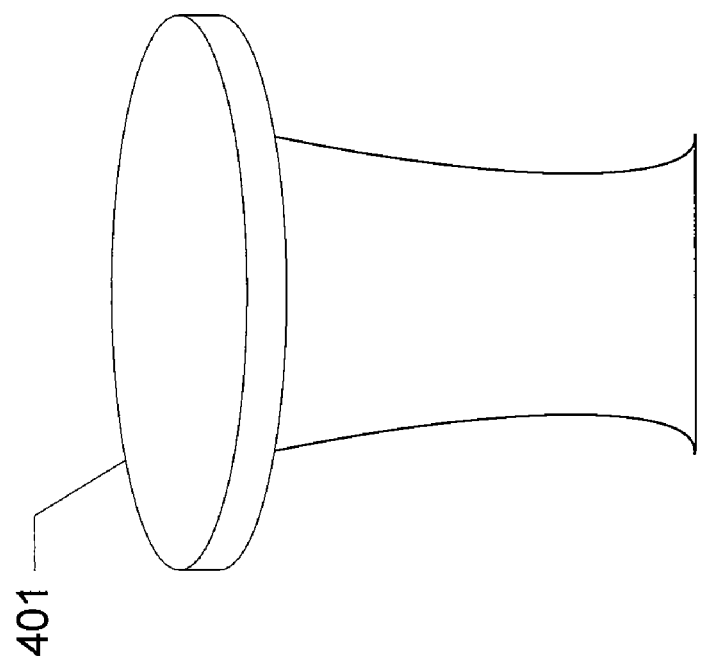
FIG. 4 illustrates a top view of the display from FIG. 3 in accordance with one or more aspects of the present invention.

FIG. 4 illustrates an illustrative configuration of an implementation of the system shown in FIG. 3, in which device 401 is used as a tabletop display device. FIG. 5 illustrates an overhead view of such a table, around which a number of users 501 may be seated or standing. Each user 501 may wish to interact with the display on the surface of table 401, for example to place and/or touch an object, or to play a party video game.

Figure 6:
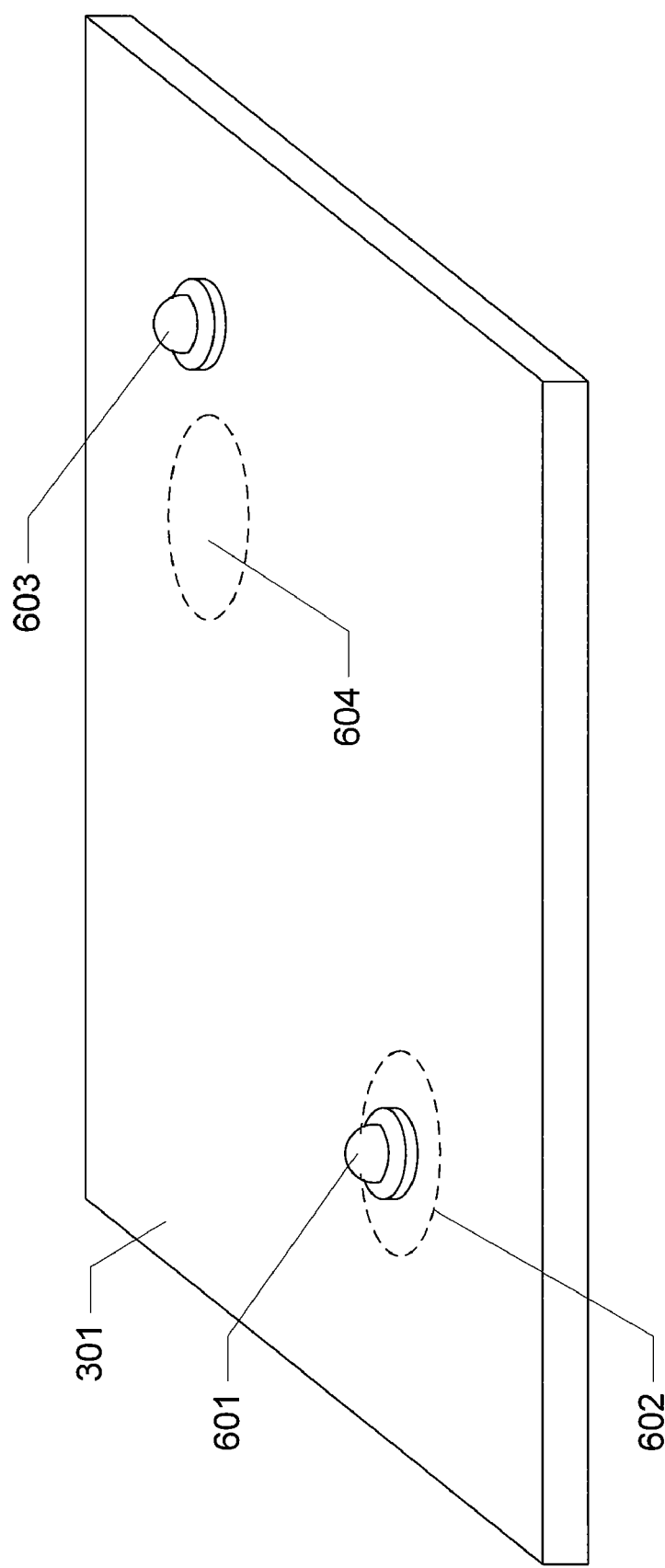
FIG. 6 illustrates an example display surface having a physical object and corresponding virtual version image according to an illustrative aspect of the invention.

FIG. 6 illustrates an example implementation, where a display surface 301 is used to provide a user with a display. The display may involve one or more physical pieces 601. Physical pieces 601 may be any type of object that the display 301 can detect. For example, pieces 601 may be wooden chess pieces, a plastic replica of a television remote control (or an actual remote control), a game piece resembling a controllable character of a game (e.g., a tennis player), etc. When placed on the display surface 301, an image 602 may be displayed to correspond with the physical piece 601. The displayed image 602 may be a virtual representation of the physical piece 601, and may graphically share visual features. For example, if piece 601 is a queen chess piece having a crown and robe, the image 602 may display an image of a woman having a crown and robe. If the physical piece 601 is a tennis player, the image 602 may include the same clothing, or equipment (e.g., racquet), or facial features as the physical piece 601. If the physical piece 601 represents a television remote control, the image 602 may display the same control buttons and control input options available through a remote control.

The location of the displayed image 602 may be synchronized with the placement of the piece 601 relative to the display 301. For example, in FIG. 6, the image 602 is shown as appearing directly underneath the location of the physical piece. Other predetermined orientations may be used as well, such as having the image 602 appear offset from the physical piece 601 in a predetermined direction (e.g., appearing to the left of the piece 601, to the right, above, at a predetermined radial degree, such as 35 degrees, from the physical piece, etc.), and by a predetermined distance (e.g., appearing one centimeter away, two inches away, etc.).

As shown in FIG. 6, a second object 603 may have an associated image 604 located offset to a side (e.g., to the left), and separated by a distance (e.g., one inch). Different offsets may be desirable when portions of the image 602 need to be seen by the user. For example, if the physical piece 601 and image 602 are of a television remote control (or other electronic device), the image 602 may include input-sensitive keys resembling the buttons on a remote control, and the user may wish to have access to those displayed buttons in order to use them. To accommodate that, the displayed image 602 may automatically be offset from the physical piece 601 by a larger distance, so that the physical piece 601 does not obscure predetermined areas of the image 602.

Figure 7:
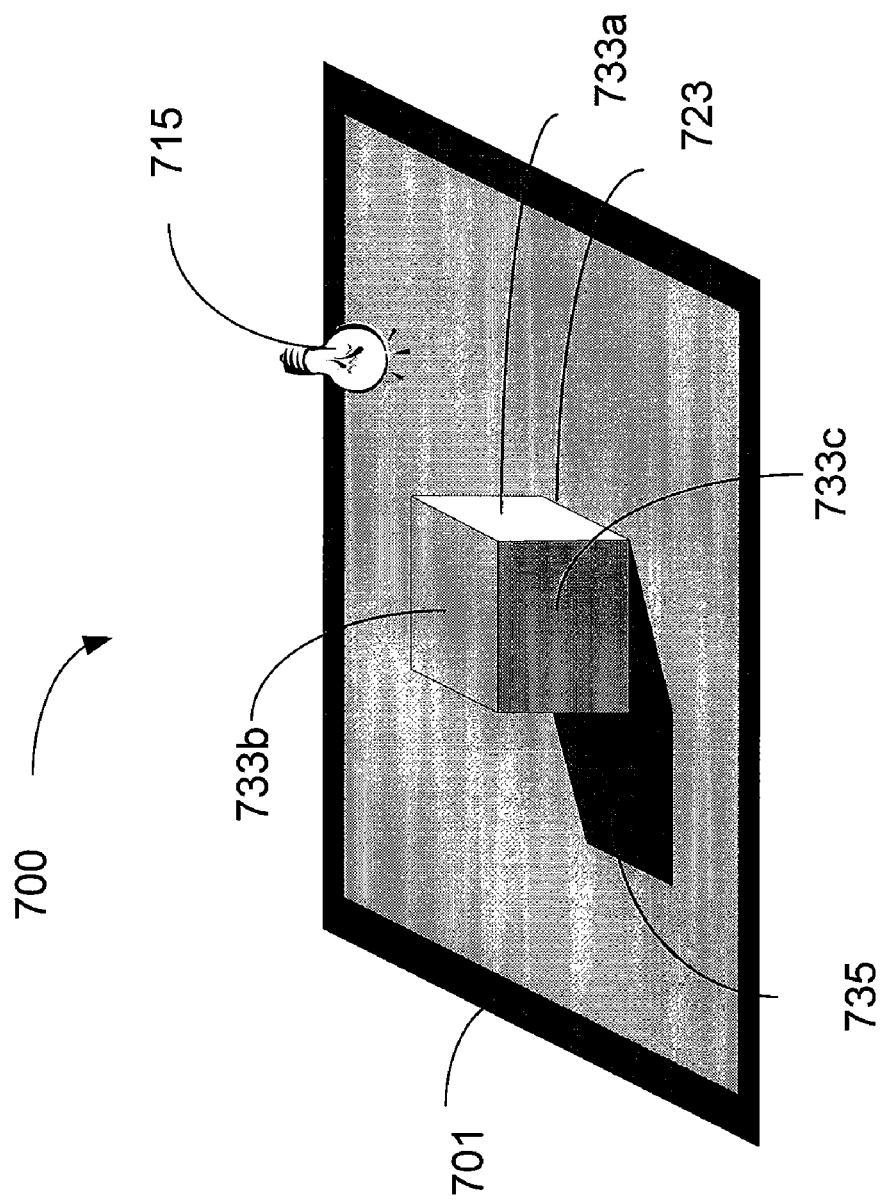
FIG. 7 illustrates an example of a display surface rendering a virtual object in accordance with at least one aspect of the present invention.

In accordance with one or more aspects of the present invention, light sensors or a camera input may be used to render a scene consistent with the ambient lighting environment around a computing device. FIG. 7 illustrates an example of a display surface rendering a virtual object. Display surface 701 is shown displaying a picture 723 of a cube. The picture 723 of the cube corresponds to a virtual object. The virtual object is displayed to appear as a 3D object. Also shown is a light source 715 in a room 700 above and to the right of the display surface 701. The picture 723 that is shown is shown consistent with how a real world cube of the same size and in the same location would be lit by light source 715 in room 700.

In the example of FIG. 7, the cube face to the right 733a is facing the light source 715, and hence is lighter in appearance than the other cube faces 733b and 733c. In addition, cube face 733b is lighter in appearance than cubed face 733c since, if the picture 723 of the cube was actually a real cube on the display surface 701, cube face 733b would be lighter being exposed to more light form light source 715 than cube face 733c. In addition, with respect to shadowing, the picture 723 of the cube casts a shadow 735 toward the left of the cube; consistent with a real world situation and with the fact that light source 715 is located to the upper right of the picture 723 of the cube. If light source 715 were located on the left side of the cube, the cube would cast a shadow to the right of the cube. Picture 723 of the cube, e.g., object, includes shading of one or more surfaces 733a, 733b, and 733c, of the virtual picture 723. Such shading may include bright highlights based on the ambient light direction and making areas facing the light source brighter than areas at an angle to the light source.

Figure 8:
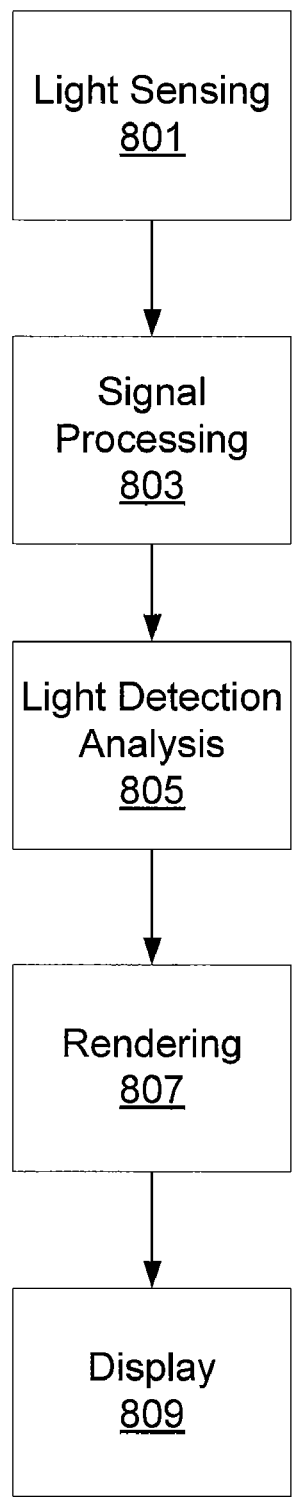
FIG. 8 illustrates a method for displaying virtual objects and shadowing effects in accordance with at least one aspect of the present invention.

Aspects of the present invention include one or more of the following five steps as illustrated in FIG. 8: light sensing, step 801; signal processing, step 803; light detection analysis, step 805; rendering, step 807; and display, step 809. Each of these features is described in more detail below.

Light sensing is one step for displaying virtual objects and shadowing effects by detecting ambient light in accordance with one or more aspects of the present invention. One embodiment of the present invention includes a device with a sensing mechanism to detect ambient light around the device. FIGS. 9A, 9B, 9C, and 10 illustrate example configurations of sensing mechanisms for detecting ambient light around a display device.

Figure 9A:
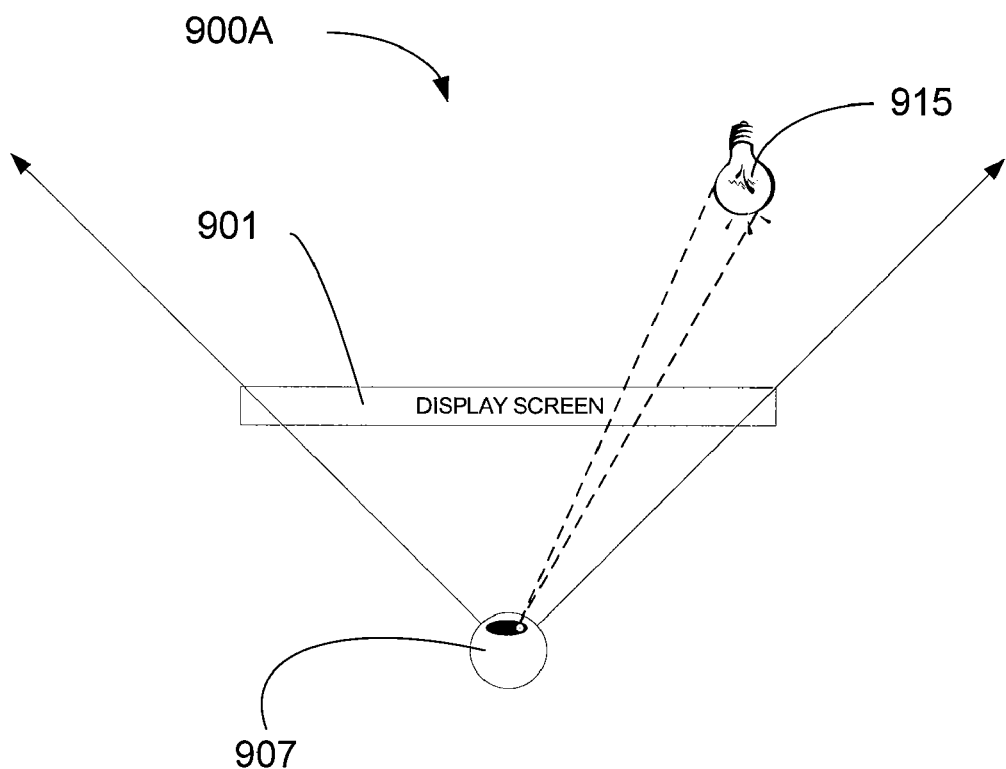
FIGS. 9A-10 illustrate example configurations of sensing mechanisms for detecting ambient light around a display device in accordance with at least one aspect of the present invention.

FIG. 9A illustrates a first example configuration 900A in which one or more cameras 907 is/are positioned behind a display screen 901. Such a configuration includes a display screen 901 that is configured to display an image while simultaneously allowing light from an external light source 915 to pass through it to the camera(s) 907. In accordance with at least one aspect, camera 907 may be configured to detect a variety of light sources 915. For example, camera 907 may be configured to detect ultraviolet light, infrared light, and white light. In other configurations, camera 907 may detect component colors separately, allowing detection of a clear white light source versus a yellow-hued light source.

Figure 9B:
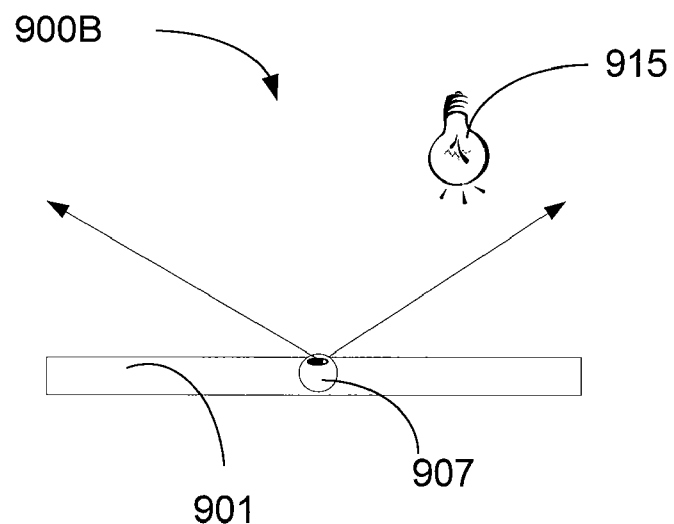
Figure 9C:
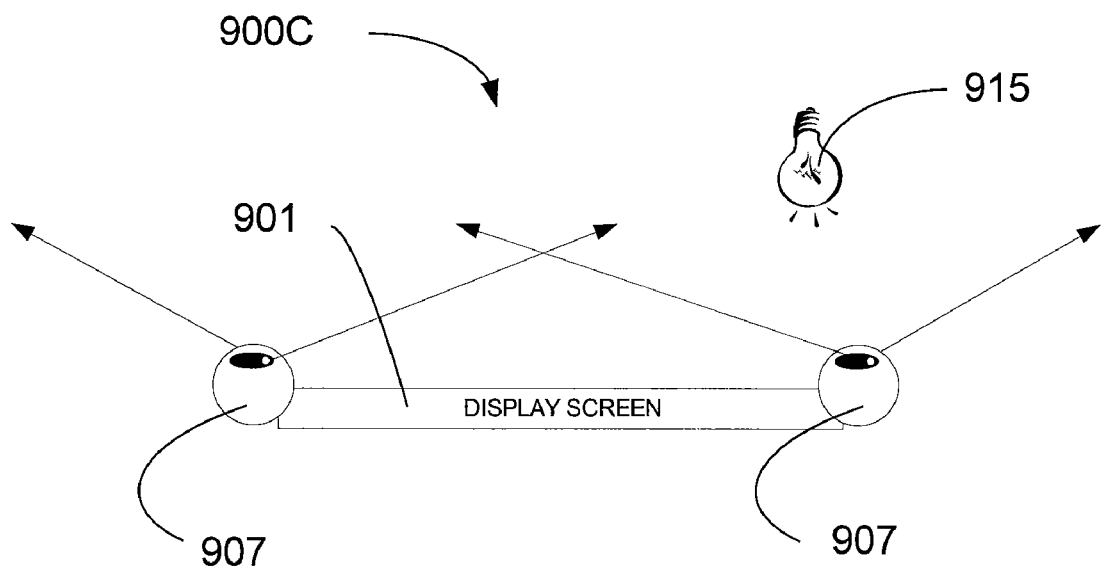

In yet another configuration, camera 907 may be positioned directly onto display screen 901 pointing outwards in a same direction as the display screen 901. FIG. 9B illustrates such an example configuration 900B. In yet another configuration, camera 907 may be positioned just along the edges around display screen 901 or at the corners of display screen 901 pointing outwards in a same direction as the display screen 901. FIG. 9C illustrates such an example configuration 900C.

Figure 10:
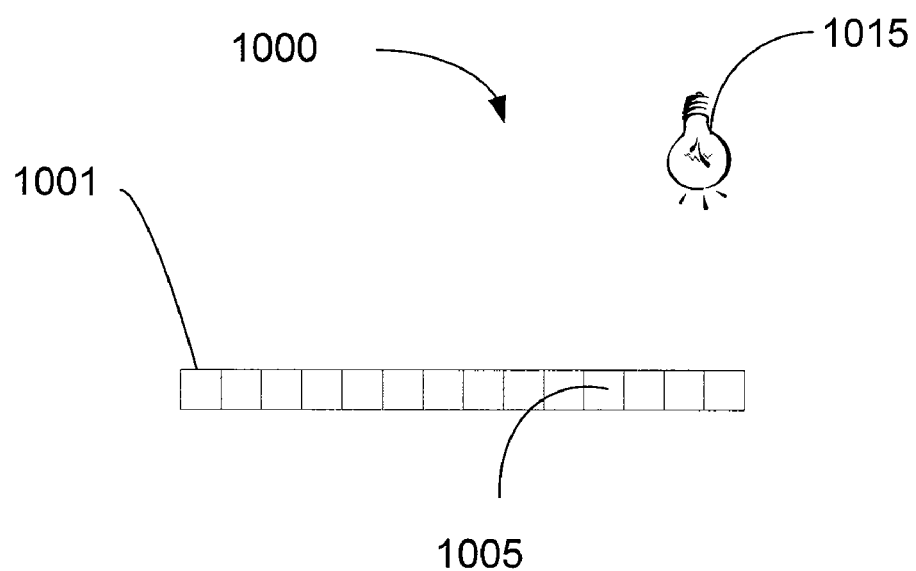

Another illustrative configuration 1000 is shown in FIG. 10. In FIG. 10, sensors for detecting light are embedded in a display screen 1001. As shown, display screen 1001 includes an array of light sensors embedded right in the display screen 1001. It should be understood by those skilled in the art that LCD screens with light sensors embedded in each pixel is known. These light sensors may be configured to provide a single intensity level of light, from a source 1005, at a particular pixel, such as pixel 1005. In accordance with another embodiment, the light sensors may be configured to provide color input.

In accordance with aspects of the present invention, the light sensors receive an array of pixel values that are treated as light input. As new frames of pixel values are received as input, rendering and display, described below, is updated accordingly. As a result, as light sources are turned on/off and/or moved around an environment, such as a room, a displayed virtual object reacts appropriately as described below.

Signal processing is another step for displaying virtual objects and shadowing effects by detecting ambient light in accordance with one or more aspects of the present invention. With the light input, image processing of the input as it is received may occur. Various operations may be performed at this step in order to format the light input data for further analysis. One example operation includes adjusting the received data for input characteristics of the light sensors. For example, distortion caused by a camera lens may be corrected. In addition, if in calibrating the camera certain pixels are known to be brighter than others due to artifacts in the camera or in the configuration setup of the camera, such calibration parameters may be corrected here.

Another operation may be performed if the brightness response of the input sensors is not linear. Utilizing known techniques in the art for such processing, brightness response may be adjusted, converting from the input range of the camera, which is likely a limited input range, to a different scale. Heuristics may be used to adjust values that are at the maximum range of the camera input, as the dynamic range of real lighting is much higher than any camera can actually receive. For example, one manner to adjust includes an inverse blooming effect. If an adjoining grouping of pixels is at the maximum intensity of the camera, a theoretical value may be set that is higher than the maximum intensity based on how many pixels are in the adjoining grouping. An assumption may be made that a bright light will bleed into multiple pixels and that how many pixels are caused to saturate is related to the true intensity of the light.

Still another operation may include scaling down the resolution. Efficient operation may be achieved by choosing to filter a high-resolution bitmap of light input to a smaller resolution or just sample every 'N' pixels. Still further, an operation to increase contrast of an input bitmap or filter out values that are less bright may be utilized. For example, only the brightest 'N' number of pixels may be kept for processing purposes, or only pixels within 90% of the brightest value may be kept. There are any of a number of other techniques that may also be used that increase the contrast of an image. Another way of filtering an image may include keeping only an outer edge, such as top, bottom, left, and/or right, row(s) and/or column(s), of pixels. Such a manner of filtering is sufficient to produce a convincing effect because light from different angles is likely to show up as differences along the screen edges.

Figure 11:
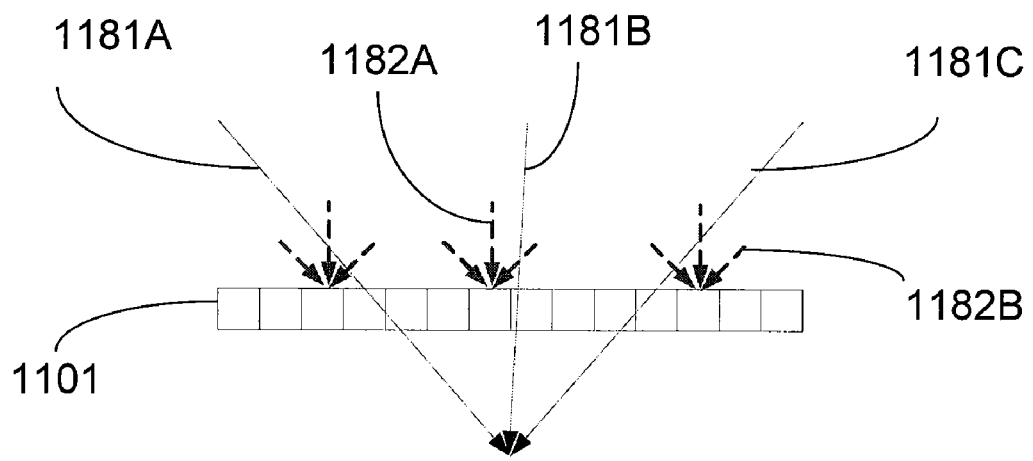
FIG. 11 illustrates an example configuration of light detection in accordance with at least one aspect of the present invention.

Light detection analysis is another step for displaying virtual objects and shadowing effects by detecting ambient light in accordance with one or more aspects of the present invention. In this step, a light input bitmap may be converted into a form usable for traditional graphics rendering. With a camera light sensor, a pixel represents a ray coming from the camera in a particular direction. With a light sensor embedded in a display screen, the input correlates to captured light hitting the sensor pixel from all directions, instead of a ray. FIG. 11 illustrates such a configuration. For example, solid line arrows 1181A-1181C illustrate light received from specific angles by pixels at the camera, while broken line arrows, such as 1182A and 1182B, illustrate light received from all angles by pixels embedded in a display screen 1101.

In general, a point light is detected by a camera only on a single pixel, while on an LCD screen, every pixel would be affected by the light to varying degrees. In accordance with at least one aspect of the present invention, one configuration includes a camera behind a display screen resulting in a combination of these two detections because the display screen acts to scatter the light that passes through.

In one configuration, the light input from each angle may be detected to determine the direction of the light, and the light intensity at each pixel is detected to determine which areas of the display screen are lit or in shadow. A camera would be used for determining light direction while display screen sensors would be used for determining the area of light and shadow across the display screen. Multiple cameras at various points across the display screen serving as light sensors may also be used. By combining these two detection mechanism, a more accurate depiction of light received for analysis purposes may be achieved.

For light detection analysis of the light input, several techniques may be used, whether used independently or in combination. Three such illustrative techniques, creating directional lights, creating an environmental map, and creating a shadow map, are described below.

Figure 12:
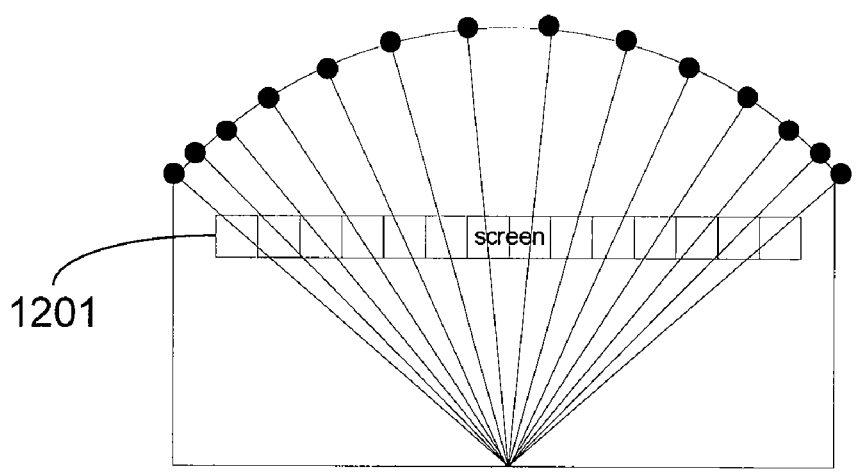
FIG. 12 illustrates an example configuration of light detection in accordance with at least one aspect of the present invention.
Figure 13:
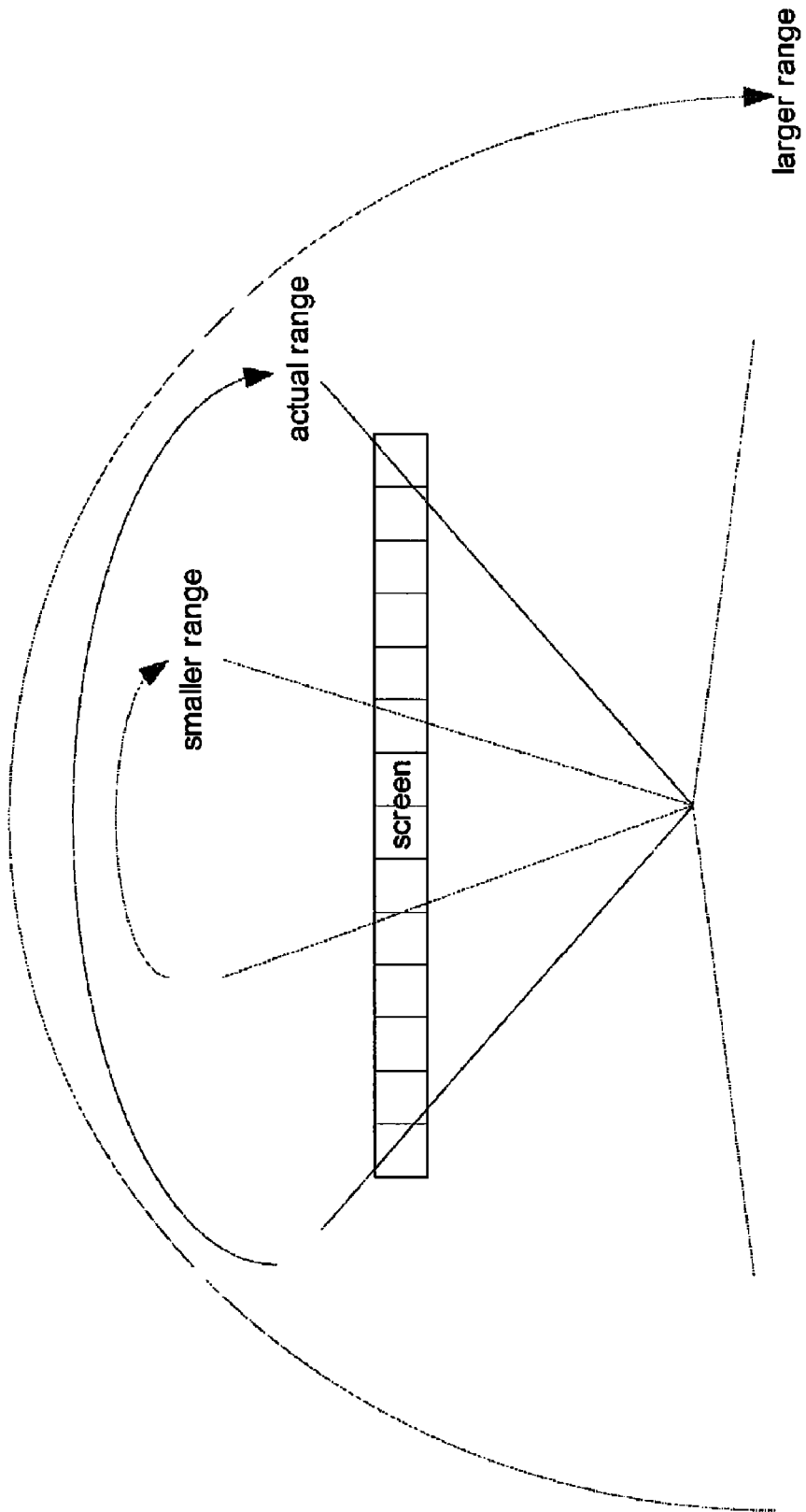
FIG. 13 illustrates an example configuration of light detection in accordance with at least one aspect of the present invention.

For the technique of creating directional lights, each pixel is assumed to correspond to the intensity of light in a certain direction. The direction may be based on a physical layout of a device or just arbitrarily scaled into an arc, such as shown in FIG. 12. Although only shown with respect to one dimension of a display screen 1201, it should be noted by those skilled in the art that this configuration actually occurs in both dimensions of a display screen. In accordance with one embodiment, exact geometry may not be utilized, rather x/y positions on the display screen may be scaled to cover a given angle in space. For example, the detected range may be extended or minimized in a range larger or smaller than the actual angle expected for a device. FIG. 13 illustrates such a situation.

The result of this technique is a set of independent directional lights, one for each pixel. Alternatively, point lights may be created by assuming an arbitrary distance to the light source. There may also be configurations that determine the position of light(s) based on an array of light detection sensors. Such a configuration would have an advantage of reducing the number of point lights to just those actually present in the environment, such as a room, and presenting a distance to the light source instead of just a direction.

Figure 14:
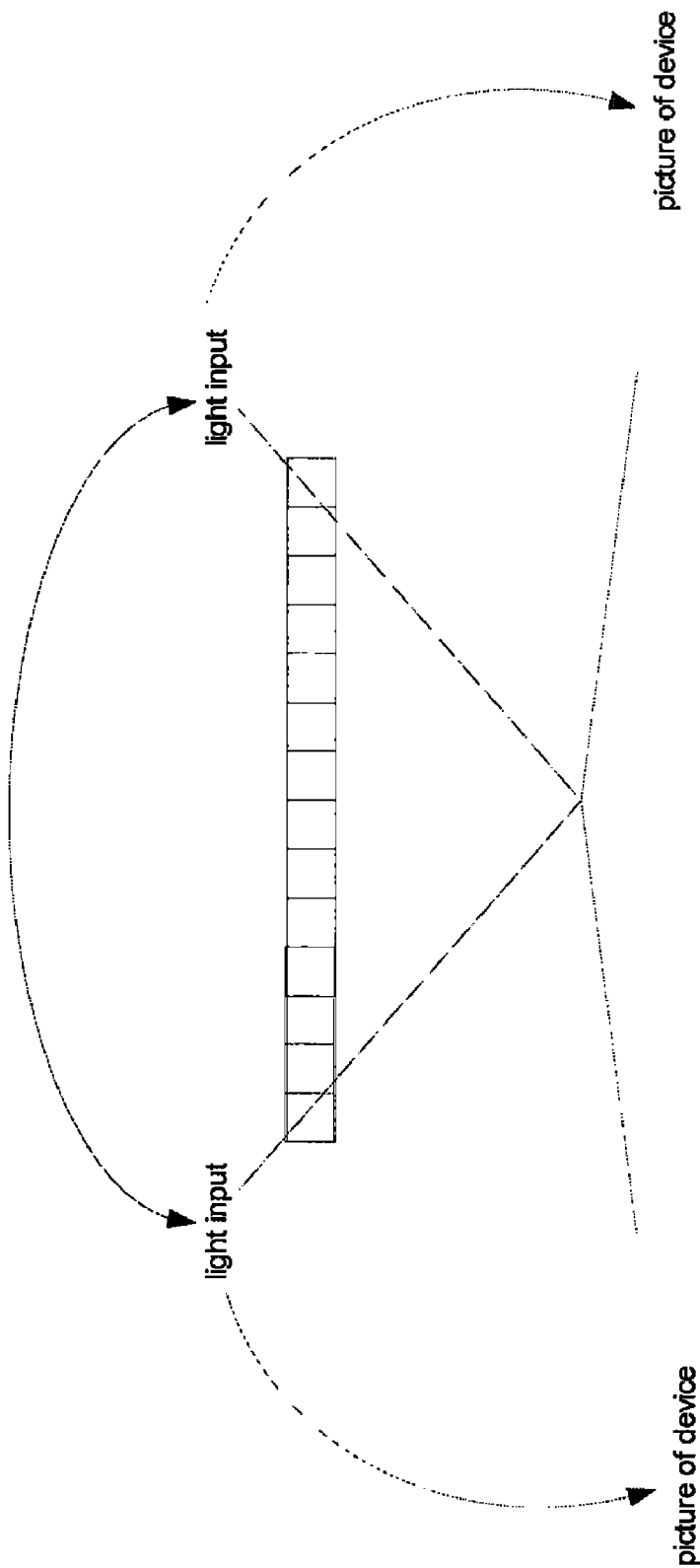
FIG. 14 illustrates an example configuration of light detection in accordance with at least one aspect of the present invention.

Light input could also be used for the technique of creating an environmental map. The light input may be projected onto a sphere map or a cube map based on the direction as computed for directional lights. For a cube map, one configuration may include directly using the input texture as a top face of the cube. For areas of an environment map that are not receiving light input, artificial input may be created in advance based on the look of the device itself, such as showing the edges of the device in the environment map. FIG. 14 illustrates such an example configuration. One configuration allows for passage of the light input directly on to a rendering system where the light input is used as a texture and the rendering system performs lookup operations directly into that texture according to the angle of a ray that the system wants to look up in the environment map.

Figure 15:
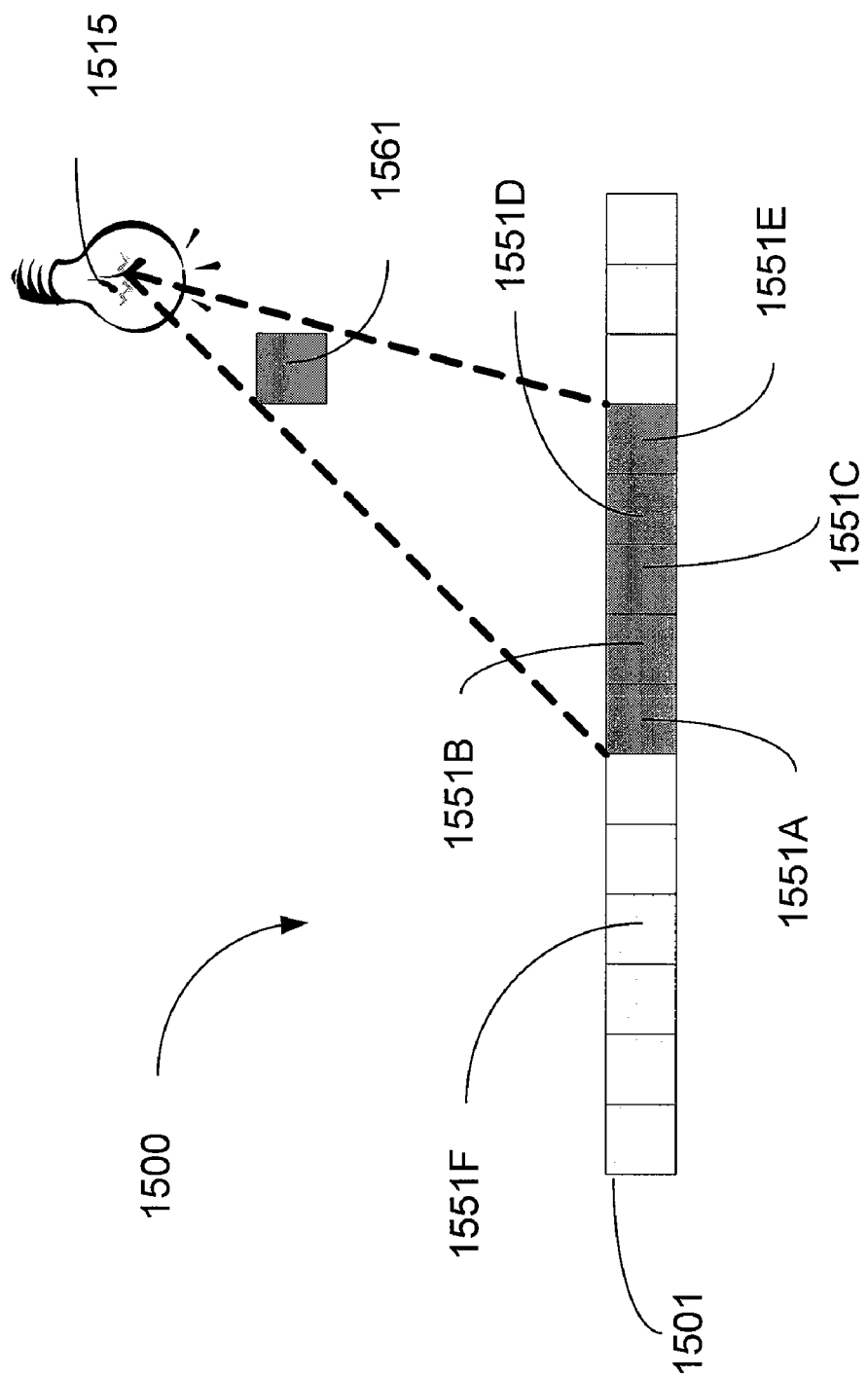
FIG. 15 illustrates an example configuration of light detection and shadowing in accordance with at least one aspect of the present invention.

For the technique of creating a shadow map, a different model may be utilized. Such a model takes in account that areas of a table with a display screen may be in shadow and that the light input represents that effect. FIG. 15 illustrates such a situation 1500. As shown, light source 1515 emits light toward display screen surface 1501. In this example, some pixels, 1551A-1551E, of the display screen surface 1501 are obscured from the full intensity of the emitted light by a real world object 1561. Pixels 1551A-1551E are shown darker in comparison to other pixels, such as pixel 1551F, of the display screen surface 1501. Real world object 1561 may be any type of physical object that obstructs the light emitted form light source 1515. For example, object 1561 may be a person, a cup, or a piece of furniture. In addition, although shown at a distance from display screen surface 1501, object 1561 may be physically next to or on top of the display screen surface 1501.

The pixels are then combined to generate a shadow map across the display screen surface 1501 at a particular time. Such a shadow map may be passed on to a rendering system for use in shading virtual objects. Objects, or vertices/pixels within objects, may be rendered to appear as if they are in light or shadow. The process of rendering may include projecting the object directly up/down to a virtual location corresponding to the surface of the display screen surface, consulting the shadow map corresponding to that point, and adjusting the light intensity that the object otherwise would have been rendered with according to the shadow map value.

Figure 16:
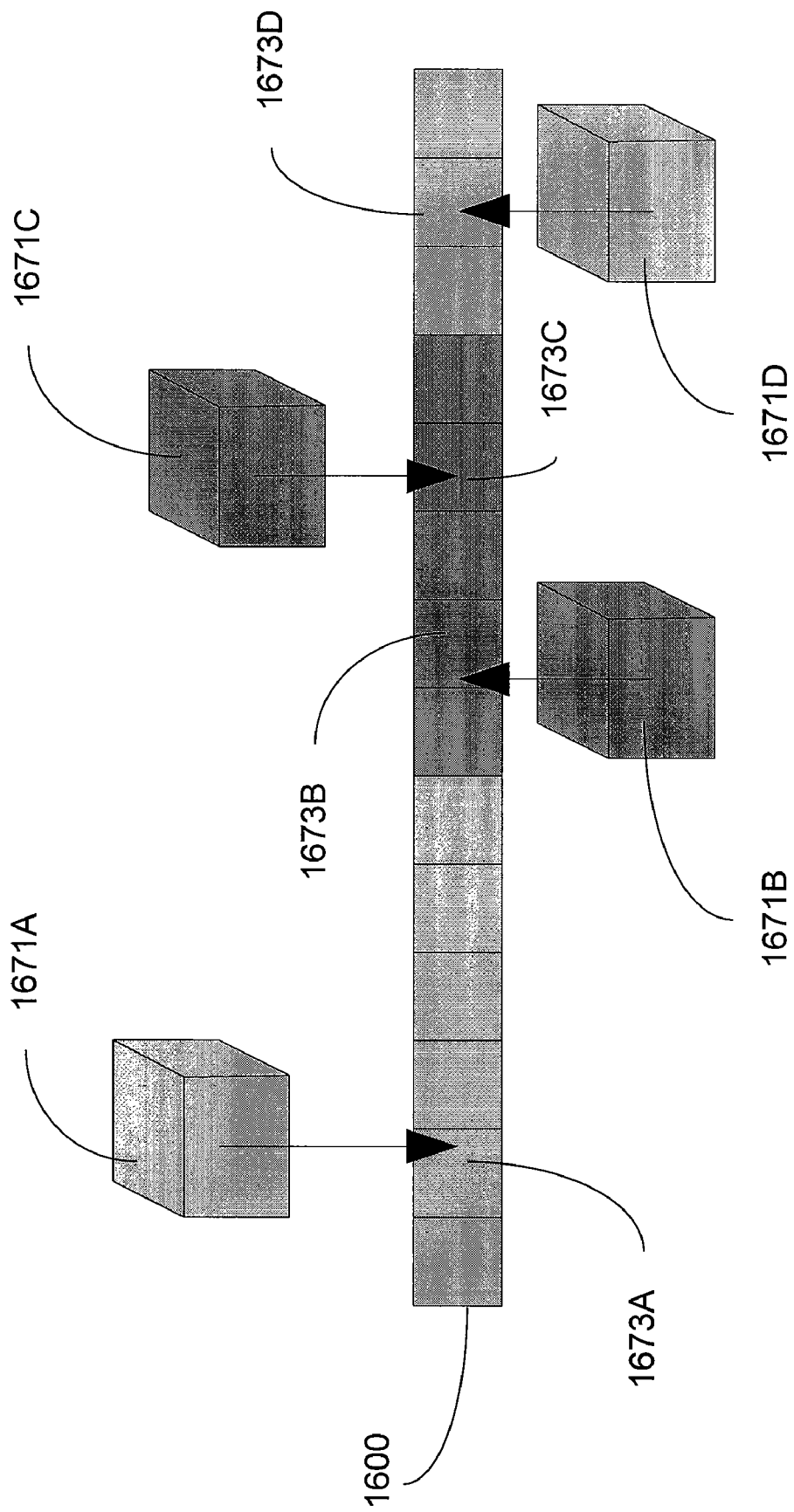
FIG. 16 illustrates an example configuration of light detection and shadowing in accordance with at least one aspect of the present invention.

Other configurations include analysis of other light inputs around a pixel for determination of shadowing effects. For example, FIG. 16 illustrates such a configuration. As shown, a set of virtual cubes, 1671A-1671D, examine the light input at a screen position, 1673A-1673D, above/below them and then modify their shading according to the amount of light reaching the display screen surface 1600 at that point.

Any of a standard array of rendering techniques may then be used. One approach utilizes diffuse illumination with 'N' directional lights based the technique of creating directional lights. Another approach adds specular reflections via an environment map lookup. If the light input is sufficiently clear, an image of the world around the device reflected in a shiny object rendered within the device may also be determined. It should be understood by those skilled in the art that specular reflection assumes a particular view direction eye point. Such requires knowledge of the location of a person viewing the image or use of a default eye point, such as a directly centered above a display screen.

Another approach uses shadow volumes or shadow buffers with 'N' point lights based on the technique of creating directional lights. In still another approach, pre-computed lighting with spherical harmonics may be used. Output data from the technique of creating directional lights or creating an environmental map may be compressed using spherical harmonic basis functions. The response to light from various angles for objects is simulated with the results also stored using spherical harmonic basis functions. This form of rendering allows objects to be rendered by combining the light spherical harmonic functions with the pre-computed object functions. Such an approach is able to capture subtle and realistic global illumination effects across an object.

Yet another approach utilizes real-time ray tracing. With modem graphics hardware, ray tracing in real time is known by those skilled in the art. The technique of creating an environmental map is suited to lighting a scene via real-time ray tracing. Rays from the eye may bounce and bend through the virtual scene, but when they eventually pass out of the scene, the rays gather light from a lookup into the environment map. Finally, another approach combines the effects of the technique of creating a shadow map with any of the above described approaches.

An additional rendering technique applies technologies for recognizing real objects placed on a display surface. In order to integrate the real world objects with the virtual world and create a more realistic environment for a user, realistic shadows may be cast from the recognized real world objects onto the virtual objects. To accomplish such an effect, a three dimensional (3D) model, e.g., approximation, for the recognized real object is utilized. The 3D model is mapped into the virtual space of the scene. Although the 3D model is not actually rendered with the scene, the 3D model may be used as an object for the purposes of casting shadows.

Finally, a rendered image may be displayed on a display screen. Light input may also be utilized for displaying as well. For example, the amount of light in an environment, such as a room, affects a person's perception of the brightness of an image. If a display monitor is taken out of a dark room into bright sunlight, the display screen of the monitor seems quite dim. As such, the overall brightness of a displayed image may be adjusted based on the ambient light level as detected by the light input. One way to determine an overall level would be to take an average of all the light inputs. Before the image is displayed, standard techniques for increasing or decreasing the brightness of an image may be used.

From light input through rendering, the level of brightness and even the gamma curve of brightness are not necessarily preserved in a realistic fashion. This step may be tuned in order to correct discrepancies in perceived overall brightness. Tuning the required adjustment may be performed by placing a real object on the table next to a virtual image rendered of a similar object. Then, a variety of lighting levels are set in the environment. For each lighting level, the required brightness adjustment may be changed, whether brighter or dimmer, until the virtual object appears to match the real object. In this way, an adjustment level for each overall brightness level may be determined. Such a step may also be used with any image on a display device, even if other parts of light direction and analysis are not present.

Figure 17A:
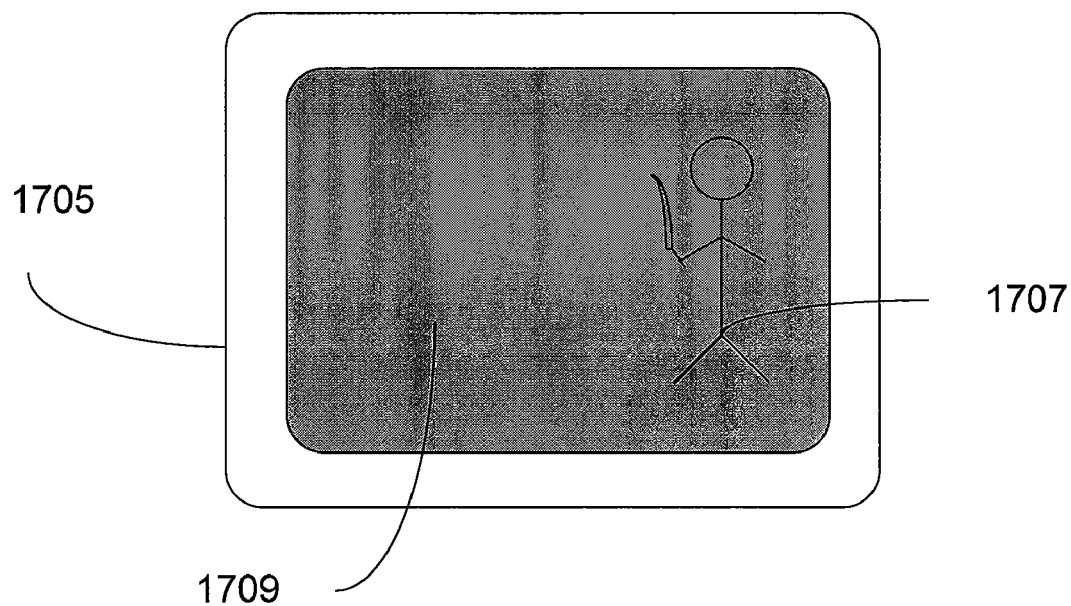
FIGS. 17A-17C illustrate an example of aspects of the present invention in use in accordance with at least one aspect of the present invention.
Figure 17C:
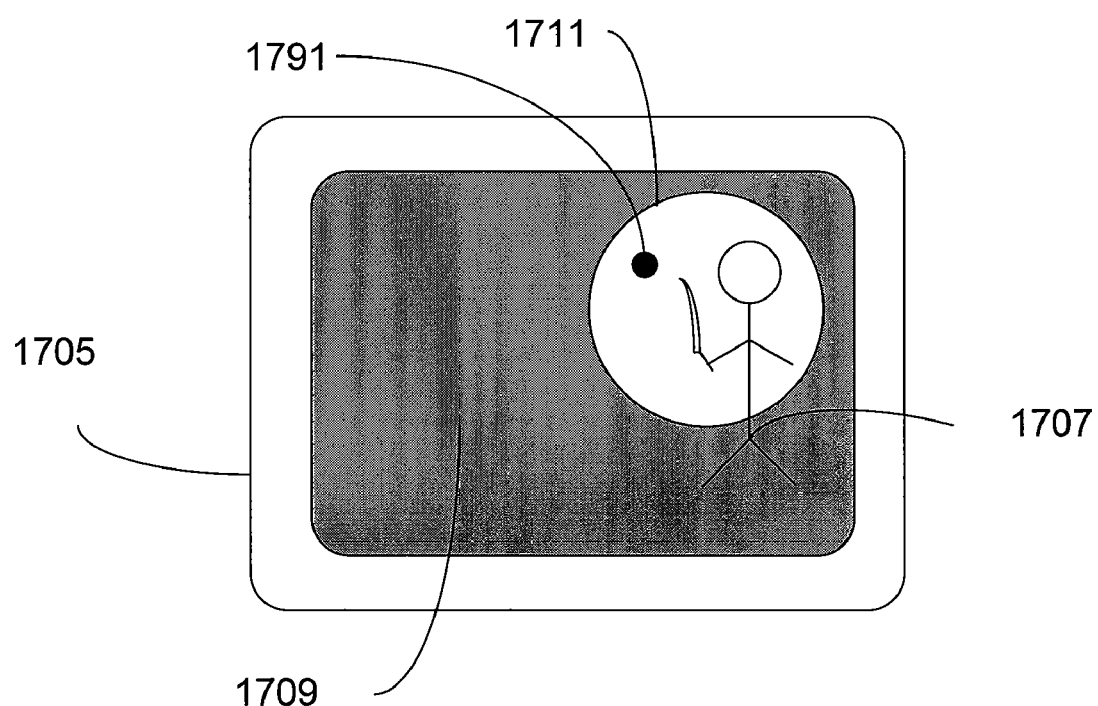
Figure 17B:
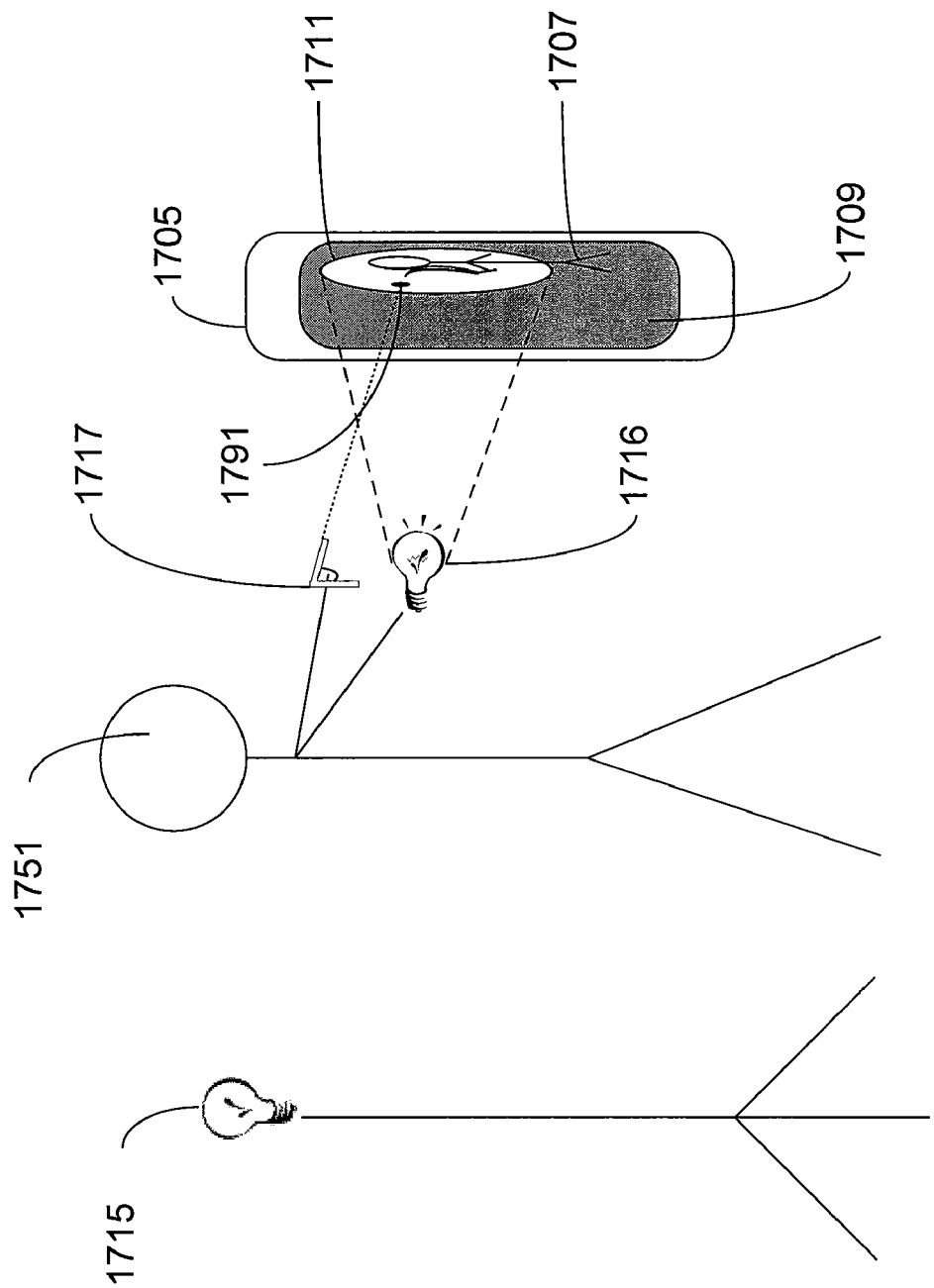

FIGS. 17A-17C illustrate an example of aspects of the present invention in use. As shown in FIG. 17A, a display screen 1705 of a monitor shows an image corresponding to a video game. In this example, a user may be playing a game in which the environment 1709 within the game itself is dark. As such, seeing potential enemies 1707 in the game may be difficult. FIG. 17B shows aspects of the present invention utilized with the display screen 1705. User 1751 is shown in a room in which there is no light source 1715 in use. As such, the room in which user 1751 is playing her video game is dark. User 1751 may actively change the display of images on the display screen 1705. In this case, user 1751 uses a flashlight 1716 with a beam of light directed toward the display screen 1705. The beam of light is detected as described herein and an illumination image 1711 is shown. In this example, the illumination image may appear as if the user is utilizing a flashlight within the game itself. Enemy 1707 is then illuminated as if user 1751 were actually pointing flashlight 1716 at another person. The affect of the flashlight 1716 beam is shown in FIG. 17C. User 1751 could then use a controller 1717, such as a video game gun, to shoot toward enemy 1707 now that enemy 1707 may be seen. In addition, controller 1717 may include the light source 1716 and/or another light source, such as a source to create red light target 1791.

By utilizing the capability of detecting ambient light, a user experiences an even greater video gaming experience. It should be understood by those skilled in the art that other types of sources of light, such as a red light target 1791 for a sniper or disco light output may be detected and integrated into the gaming environment. Still further, other scenarios beyond gaming, such as simulators and education uses may also utilize aspects of the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A system for illuminating a portion of a display based on real light conditions of a real light source, the system comprising:
 a computer display device;
 a light detection device, wherein the light detection device is configured to detect the real light conditions from the real light source that are located externally from the computer display device;
 a processor; and
 a memory having computer-executable instructions stored thereon, wherein the computer executable instructions are configured for:
  receiving data associated with the real light conditions from the real light source, wherein the data is received from the light detection device and indicates a position of the external real light source;
  obtaining a display position of a graphical object that is displayed on the computer display device;
  causing the processor to calculate a position of the real light source relative to the display position of the object that is displayed on the computer display device, wherein the position of the real light source is calculated based on a light differential across a length of the computer display device that is detected by the light detection device; and
  causing the processor to change an illumination of only a portion of the computer display device proximal the display position of the object such that a shadow is displayed on the computer display in relation to the position of the real light source relative to the graphical object, wherein the shadow that is displayed on the computer display changes when the position of the real light source relative to the display of the graphical object, wherein the illumination position and intensity are based on the calculated position of the real light source relative to the obtained position of the graphical object associated with the computer display device; wherein the illumination changes a display of the graphical object on the computer display device.

2. The system of claim 1, wherein the object is a non-physical virtual object displayed on the computer display device, wherein causing the processor to illuminate a portion of the computer display device proximal the position of the object includes causing the processor to increase the illumination intensity on a first portion of the computer display device proximal the position of the object and decrease the illumination intensity on a second portion of the computer display device proximal the position of the object.

3. The system of claim 1, further comprising detecting a physical non-virtual real object proximal the computer display device, wherein the light detection device detects a light differential generated by the proximity of the non-virtual real object to the computer display device, wherein the computer-executable instructions calculate the position of the non-virtual real object in relation to the computer display device based on the detected light differential, wherein causing the processor to illuminate a portion of the computer display device includes causing the processor to change the illumination of a portion of the computer display device proximal the calculated position of the non-virtual real object based on the calculated position of the non-virtual real object relative to the calculated position of the real light source.

4. The system of claim 3, wherein proximal the display includes in contact with the display.

5. The system of claim 3, wherein proximal the display includes hovering above the display.

6. The system of claim 1, wherein the computer display device is a horizontal display configured to allow the external real light to pass through, wherein the light detection device includes a light sensor and a camera positioned behind the horizontal display.

7. The system of claim 1, wherein the light detection device includes a light sensor.

8. The system of claim 7, wherein the light sensor is embedded in a screen of the computer display device.

9. The system of claim 1, wherein the light detection device includes a plurality of light sensors embedded in pixels of the computer display device, wherein light detected at a first pixel effects the display illumination of a second pixel.

10. A computer-implemented method for illuminating a display based on data associated with non-virtual real light conditions of a non-virtual real light source, the method comprising:
receiving light data from a light detection device, wherein the light data is associated with a non-virtual real light source external to the display;
receiving an indication of a displayed graphical object associated with the display;
calculating a general position of the non-virtual real light source relative to the indication of the object and based on the received light data from the light detection device; and
modifying the illumination of only a portion of the display proximal the indication of the displayed object on the display based on the calculated position of the non-virtual real light source such that a shadow is displayed on the display in relation to the position of the non-virtual real light relative to the graphical object, wherein the shadow that is displayed on the display changes when the position of the non-virtual real light source relative to the graphical object changes.

11. The computer-implemented method of claim 10, wherein the object is a virtual object displayed on the display, wherein modifying the illumination of a portion of the display proximal the indication of the object includes increasing the illumination intensity on a first portion of the display proximal the indication of the object and decreasing the illumination intensity on a second portion of the display proximal the indication of the object.

12. The computer-implemented method of claim 10, wherein the object is a non-virtual real object proximal the display, wherein the light detection device detects a light differential generated by the proximity of the non-virtual real object to the display, wherein the a general position of the non-virtual real object is calculated in relation to the display based on the detected light differential, wherein modifying the illumination of a portion of the display includes changing the illumination of a portion of the display proximal the calculated position of the non-virtual real object based on the calculated position of the non-virtual real object and the calculated general position of the real light source.

13. The computer-implemented method of claim 10, wherein the illumination of the portion of the display is configured to virtually depict on the display at least one member of a group comprising: a light beam based on the non-virtual real light source external to the display, and a shadow based on the non-virtual real light source external to the display.

14. The computer-implemented method of claim 10, wherein the light detection device includes at least one member of a group comprising: a light sensor, a camera, a light sensor imbedded in a screen of the display, a light sensor position behind the display, a camera positioned behind the display, and a plurality of light sensors embedded in pixels of the display.

15. The computer-implemented method of claim 10, wherein the light detection device further includes a light intensity detector, wherein modifying the illumination of a portion of the display proximal the indication of the object is further based on the detected light intensity data.

16. A computer-readable storage medium not including signals having computer-executable instructions for generating display illumination data based on received light data, the instructions comprising:
detecting external non-virtual real light;
calculating real light data from the external non-virtual real light;
obtaining an indication of graphical object associated with the display;
determining a position of a source of the non-virtual real light relative to the indication of the graphical object associated with a display having an illumination value; and
causing a change in the illumination value for a portion of the display proximal the indication of the graphical object, wherein the change in the illumination value is based on the calculated real light data and the determined position of the source of the non-virtual real light, wherein the change in the illumination causes the display of the graphical object on the display to change such that a shadow is displayed on the display in relation to the position of the non-virtual real light relative to the graphical object, wherein the shadow that is displayed on the display changes when the position of the non-virtual real light relative to the graphical object changes.

17. The computer-readable storage medium of claim 16, wherein the object is a virtual object displayed on the display, wherein causing a change in the illumination value of a portion of the display proximal the indication of the object includes increasing an illumination intensity value on a first portion of the display proximal the indication of the object and decreasing the illumination intensity value on a second portion of the display proximal the indication of the object.

18. The computer-readable storage medium of claim 16, wherein the object is a non-virtual real object proximal the display, wherein a light differential generated by the proximity of the non-virtual real object to the display is detected, wherein the a general position of the non-virtual real object is calculated in relation to the display based on the detected light differential, wherein causing a change in the illumination value for a portion of the display includes changing the illumination of a portion of the display proximal the calculated position of the non-virtual real object based on the calculated position of the non-virtual real object and the calculated general position of the non-virtual real light source.

19. The computer-readable storage medium of claim 16, wherein the illumination value of the portion of the display is configured to virtually depict on the display at least one member of a group comprising: a light beam based on the non-virtual real light source external to the display, and a shadow based on the non-virtual real light source external to the display.

20. The computer-readable storage medium of claim 16, wherein proximal the display includes at least one member of a group comprising: in contact with the display, and hovering above the display.

\* \* \* \* \*